(12) United States Patent
Klein

(10) Patent No.: US 10,370,033 B1
(45) Date of Patent: Aug. 6, 2019

(54) SLIDING SUB-FRAME FOR HEAVY-DUTY VEHICLE SUSPENSION, INCLUDING TORQUE BOX, AIR SLIDER PIN, AND SHEAR-OFF NUT

(71) Applicant: Jason M. Klein, Nixa, MO (US)

(72) Inventor: Jason M. Klein, Nixa, MO (US)

(*) Notice: Subject to any disclaimer, the term of this patent is extended or adjusted under 35 U.S.C. 154(b) by 104 days.

(21) Appl. No.: 15/611,221

(22) Filed: Jun. 1, 2017

Related U.S. Application Data

(60) Provisional application No. 62/343,924, filed on Jun. 1, 2016, provisional application No. 62/345,948, filed on Jun. 6, 2016.

(51) Int. Cl.
*B62D 21/14* (2006.01)
*B62D 21/20* (2006.01)
*B62D 63/06* (2006.01)

(52) U.S. Cl.
CPC .............. *B62D 21/14* (2013.01); *B62D 21/20* (2013.01); *B62D 63/061* (2013.01)

(58) Field of Classification Search
CPC ....... B62D 21/14; B62D 63/061; B62D 21/20
See application file for complete search history.

(56) References Cited

U.S. PATENT DOCUMENTS

| | | | | | |
|---|---|---|---|---|---|
| 2,818,272 | A * | 12/1957 | De Lay | ................... | B62D 21/12 280/149.2 |
| 2,940,495 | A | 6/1960 | Wing | ............................ | 411/305 |
| 3,318,613 | A * | 5/1967 | House | ..................... | B62D 13/02 280/423.1 |
| 4,722,549 | A * | 2/1988 | Raidel | ..................... | B60G 11/27 280/124.116 |
| 4,988,258 | A * | 1/1991 | Lutz | ......................... | B60R 19/56 293/118 |
| 5,564,727 | A * | 10/1996 | Wessels | ................ | B62D 53/068 180/209 |
| 6,003,935 | A * | 12/1999 | Kalazny | .................. | B62D 21/14 280/785 |
| 6,213,489 | B1 * | 4/2001 | Eckelberry | ........... | B62D 53/068 180/209 |
| 6,244,608 | B1 * | 6/2001 | Hess | ..................... | B62D 53/068 14/69.5 |
| 7,198,298 | B2 * | 4/2007 | Ramsey | ................ | B62D 53/068 280/793 |
| 8,496,259 | B2 * | 7/2013 | Ramsey | ................. | B60G 9/003 180/209 |

(Continued)

*Primary Examiner* — Darlene P Condra
(74) *Attorney, Agent, or Firm* — Jonathan A. Bay

(57) ABSTRACT

Improvements to a sliding sub-frame for heavy-duty vehicle suspensions include torque boxes, an air slider-pin system, and a heavy-duty shear-off nut. In the prior art, all four sliding pins are linked together with bars so if one sliding pin is stuck they are all stuck. Here, each sliding pin has a dedicated air assist bladder and is independent and can release on its own. That way, if one sliding pin is stuck, it is a much easier job to get it unstuck by moving the vehicle. The torque box relates to stress-relief measures of shear strains at critical fastened (eg., bolted) connections. The shear-off nut has a break-neck flanked between a hex head and collet nut. The clearance between the outside sidewall of the collet nut very nearly fully spans the space between the flats of a hex socket for the hex head, thereby providing light on-axis support.

5 Claims, 16 Drawing Sheets

(56) References Cited

U.S. PATENT DOCUMENTS

| | | | | |
|---|---|---|---|---|
| 8,910,989 B1* | 12/2014 | Boltz | ................... | B62D 21/14 |
| | | | | 296/26.09 |
| 8,960,694 B2* | 2/2015 | Aalderink | ................ | B60G 7/02 |
| | | | | 280/124.109 |
| 10,011,153 B1* | 7/2018 | Klein | ..................... | B60G 11/28 |
| 2009/0243244 A1 | 3/2009 | Richardson et al. | .... | 280/86.757 |
| 2010/0086389 A1* | 4/2010 | Johnson | ................ | B60P 1/4421 |
| | | | | 414/544 |
| 2013/0026796 A1* | 1/2013 | Wagner | ................. | B23K 26/28 |
| | | | | 296/204 |
| 2013/0202345 A1* | 8/2013 | Long | ................... | B62D 53/068 |
| | | | | 403/109.1 |
| 2017/0036699 A1* | 2/2017 | Asai | ..................... | B62D 21/152 |

* cited by examiner

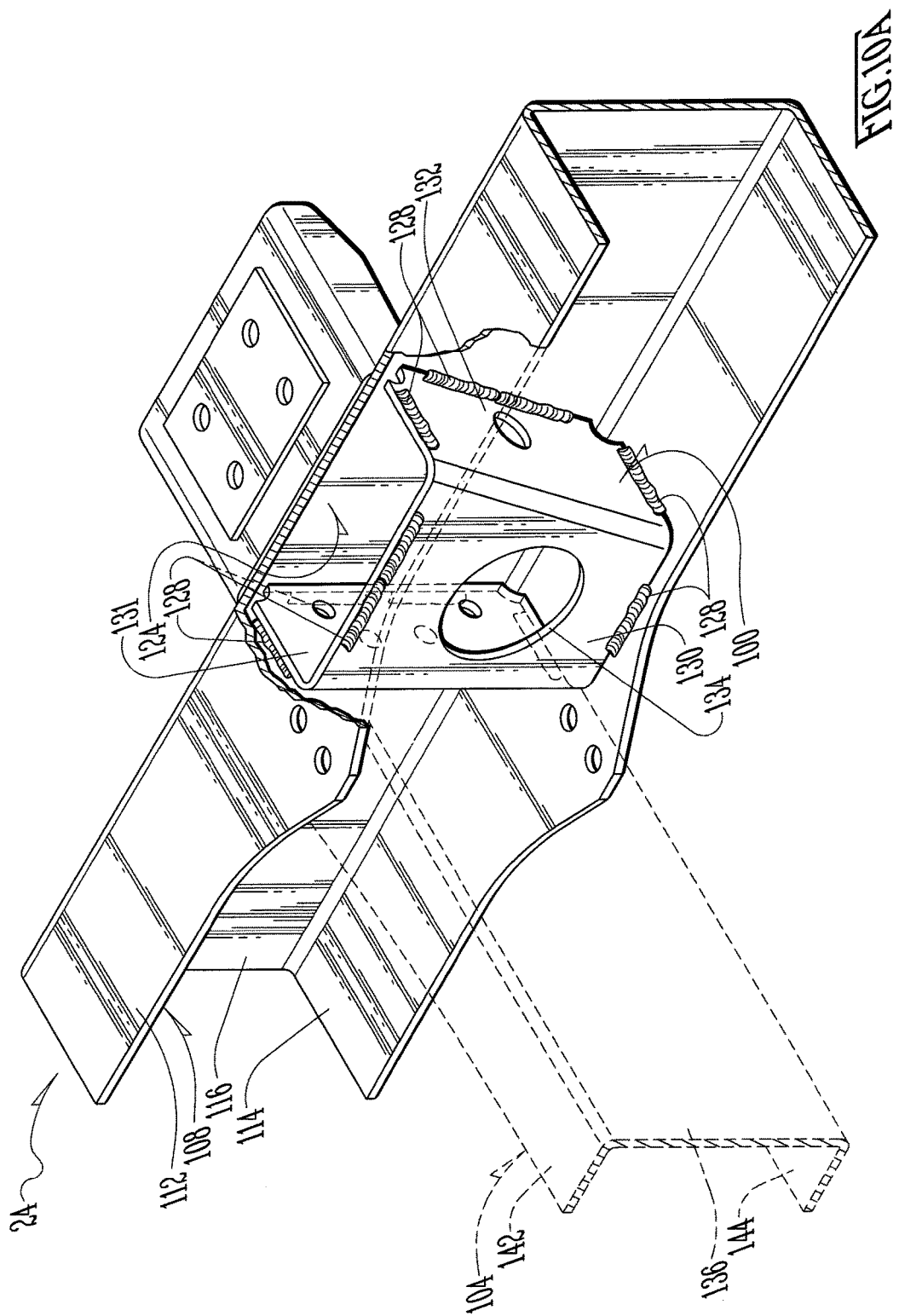

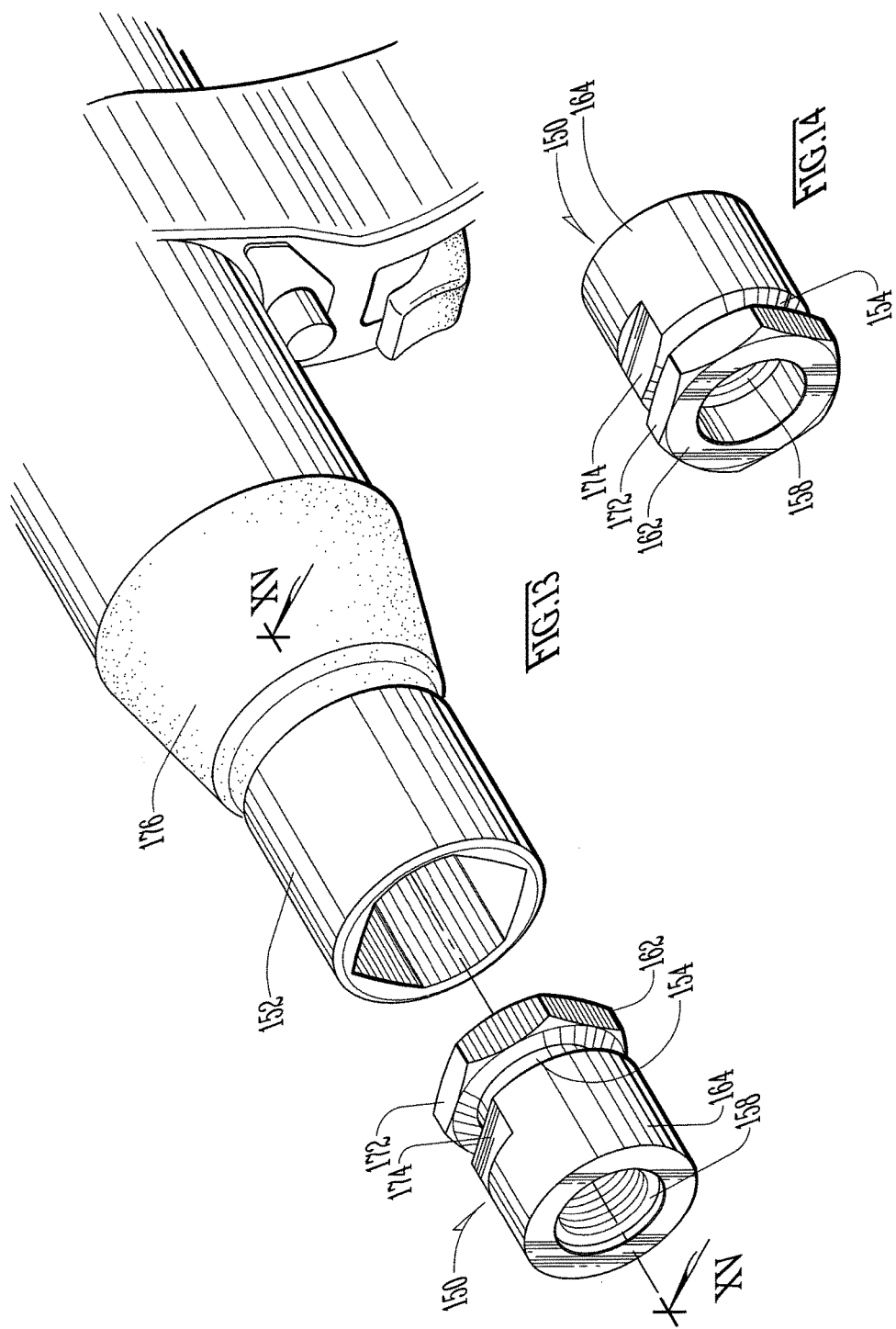

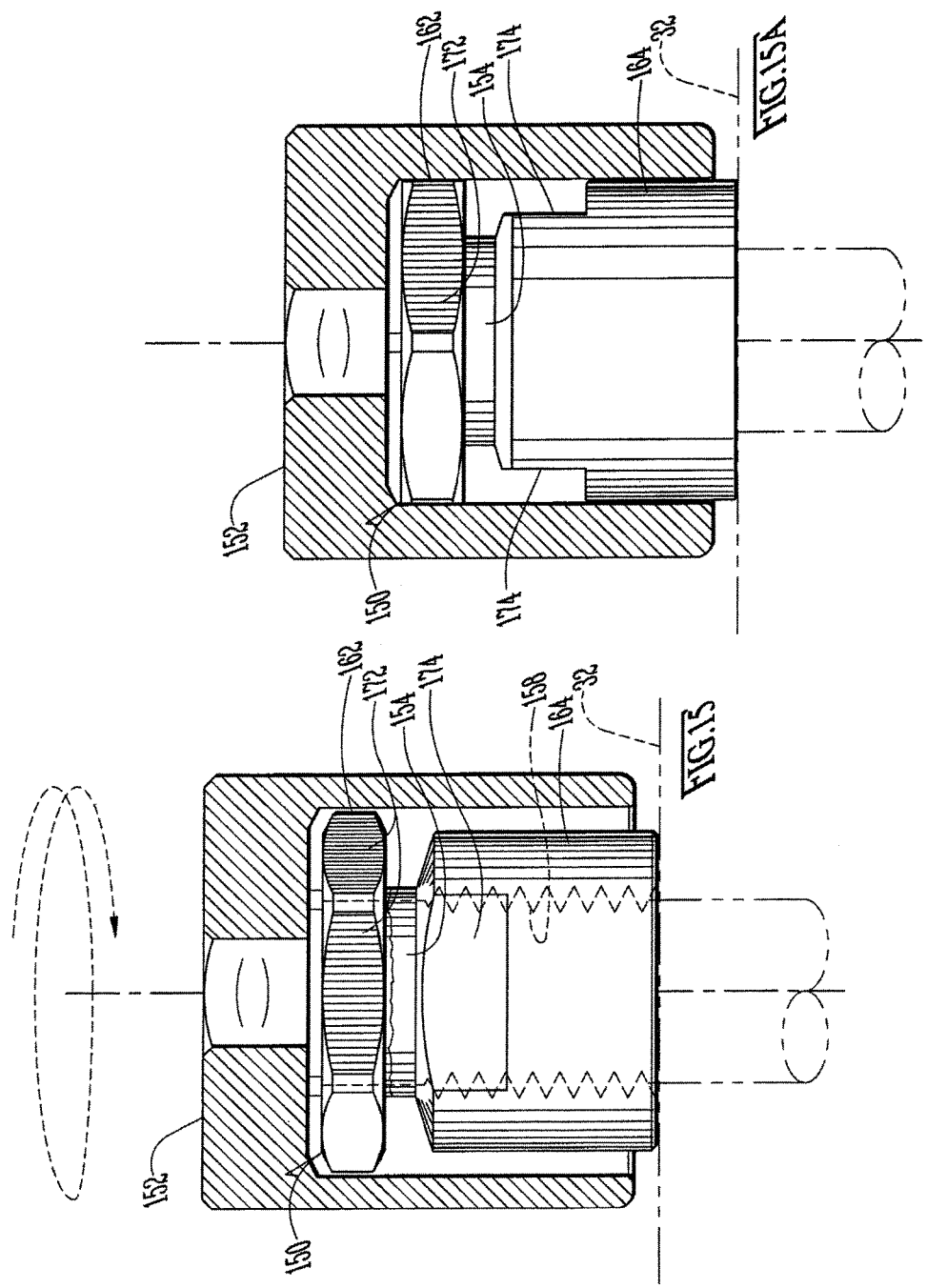

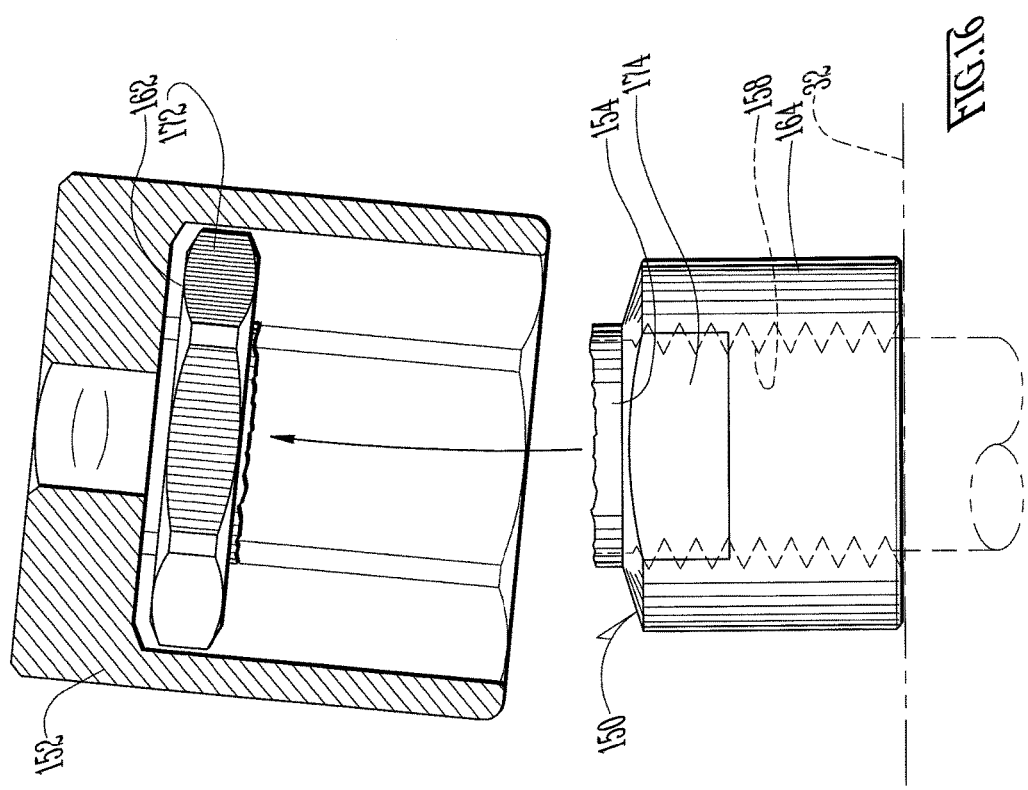

SLIDING SUB-FRAME FOR HEAVY-DUTY VEHICLE SUSPENSION, INCLUDING TORQUE BOX, AIR SLIDER PIN, AND SHEAR-OFF NUT

CROSS-REFERENCE TO PROVISIONAL APPLICATION(S)

This application claims the benefit of U.S. Provisional Application No. 62/343,924, filed Jun. 1, 2016; and U.S. Provisional Application No. 62/345,948, filed Jun. 6, 2016. The foregoing patent disclosures are incorporated herein by this reference thereto.

BACKGROUND AND SUMMARY OF THE INVENTION

The invention relates to heavy duty vehicle suspensions and, more particularly, to improvements to a sliding sub-frame therefor, including without limitation matters regarding torque boxes, direct pneumatically-actuated slider pins, and shear-off nuts.

A number of additional features and objects will be apparent in connection with the following discussion of the preferred embodiments and examples with reference to the drawings.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the skills of a person having ordinary skill in the art to which the invention pertains. In the drawings.

FIG. 10A is an enlarged-scale perspective view of detail X,A-X,A indicated in FIG. 10, with portions broken away;

FIG. 13 is an enlarged-scale perspective view of the shear-off nut shown exploded and floating apart from the suspension in FIG. 12, along with a prior art socket and impact wrench;

FIG. 14 is a perspective view comparable to FIG. 13 except with the nut of FIG. 13 spun about 1800 in a horizontal plane;

FIG. 15 is an enlarged-scale partial sectional view taken through the center axis of the nut and showing the socket engaging the nut to tighten it on the bolt thread therefor, and as taken across the points of the socket;

FIG. 15A is a partial sectional view comparable to FIG. 15 as taken across the flats of the socket; and FIG. 16 is a partial sectional view comparable to FIG. 15 except showing the nut sheared in two at the break neck therefor.

DETAILED DESCRIPTION OF THE PREFERRED EMBODIMENTS

Figure 1:
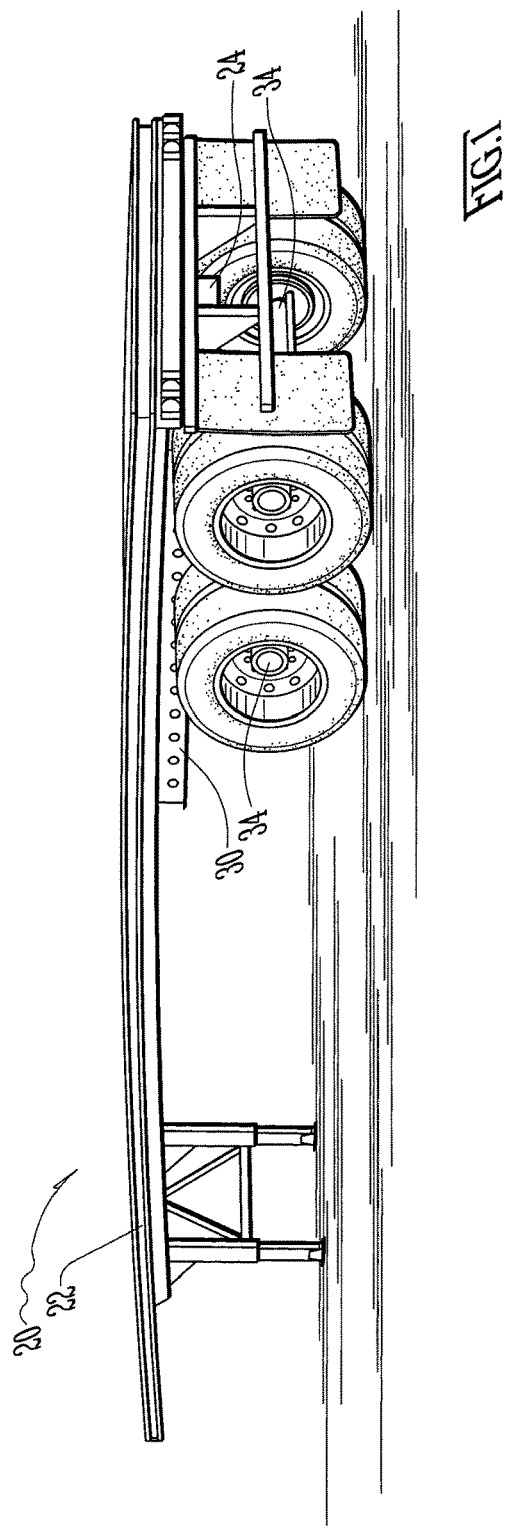
FIG. 1 is a perspective view of a conventional heavy-duty vehicle (eg., a semi-trailer constructed for a heavy-duty load rating) and is mounted on a sliding sub-frame in accordance with the invention (not in view, but see FIG. 2) for a heavy-duty vehicle suspension.
Figure 2:
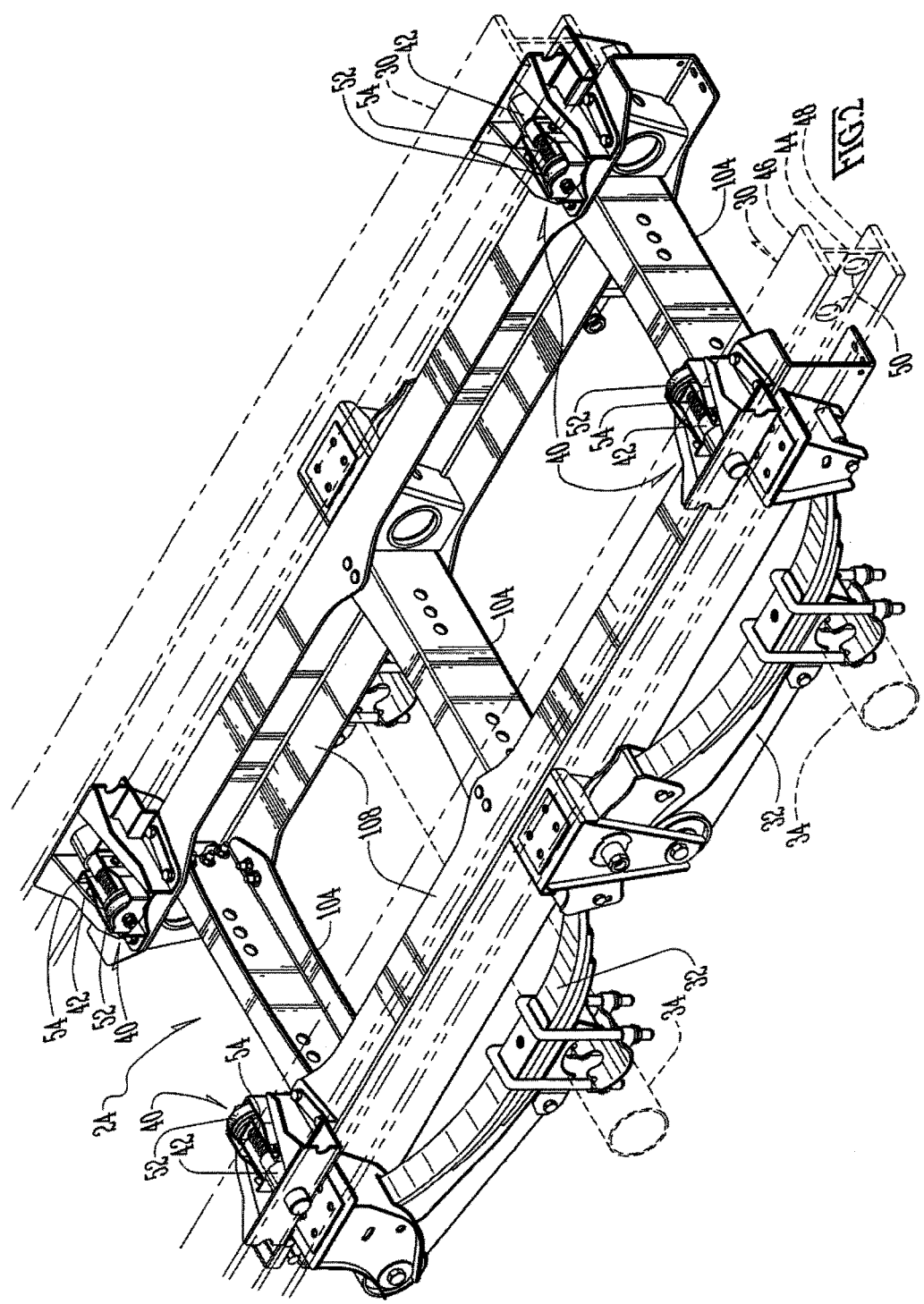
FIG. 2 is an enlarged-scale perspective view of the sliding sub-frame in accordance with the invention, with portions of the vehicle (eg., trailer) shown in hidden lines and other portions broken away.
Figure 3:
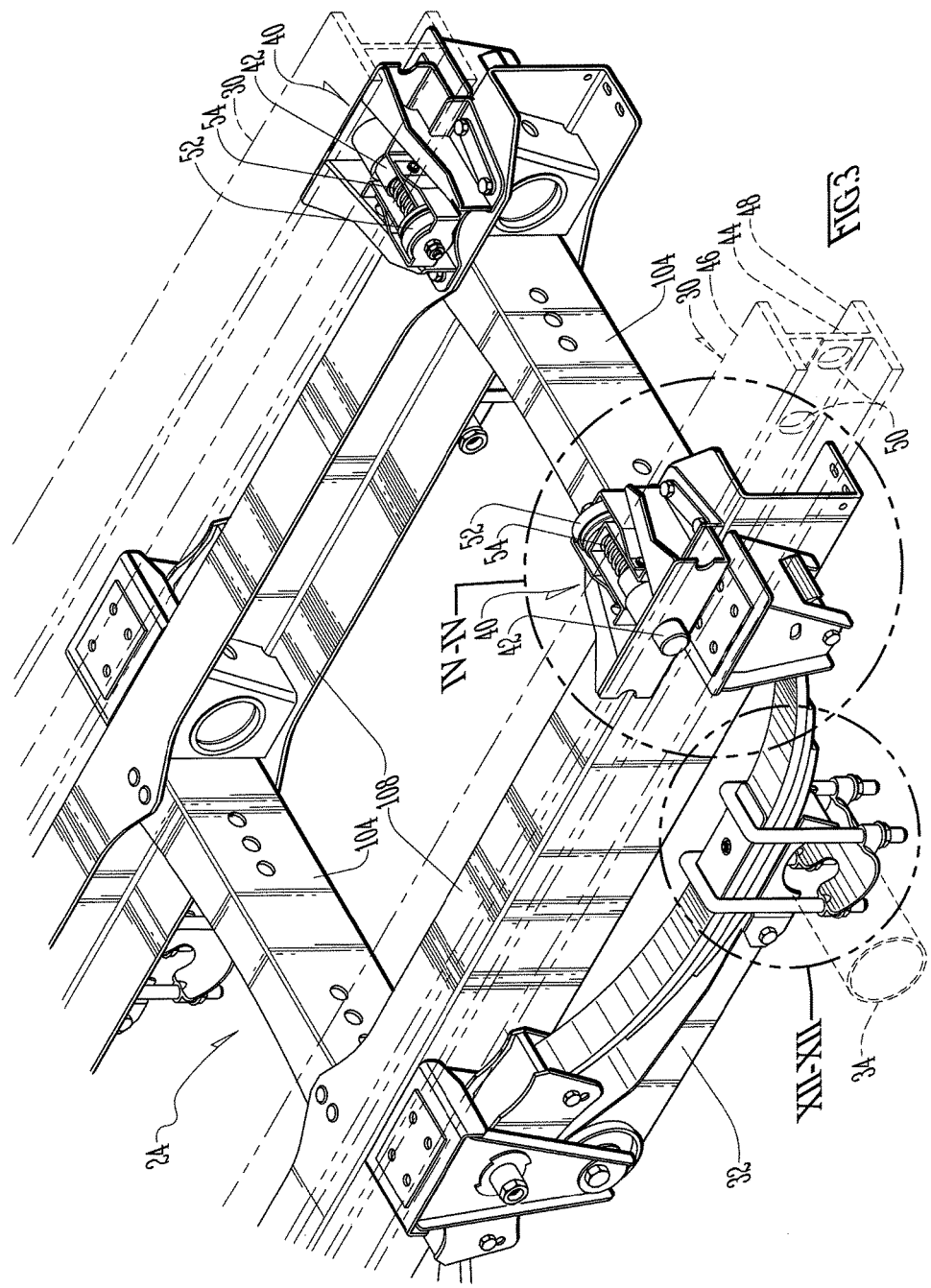
FIG. 3 is an enlarged-scale perspective view of the lower, two-thirds of FIG. 2.
Figure 4:
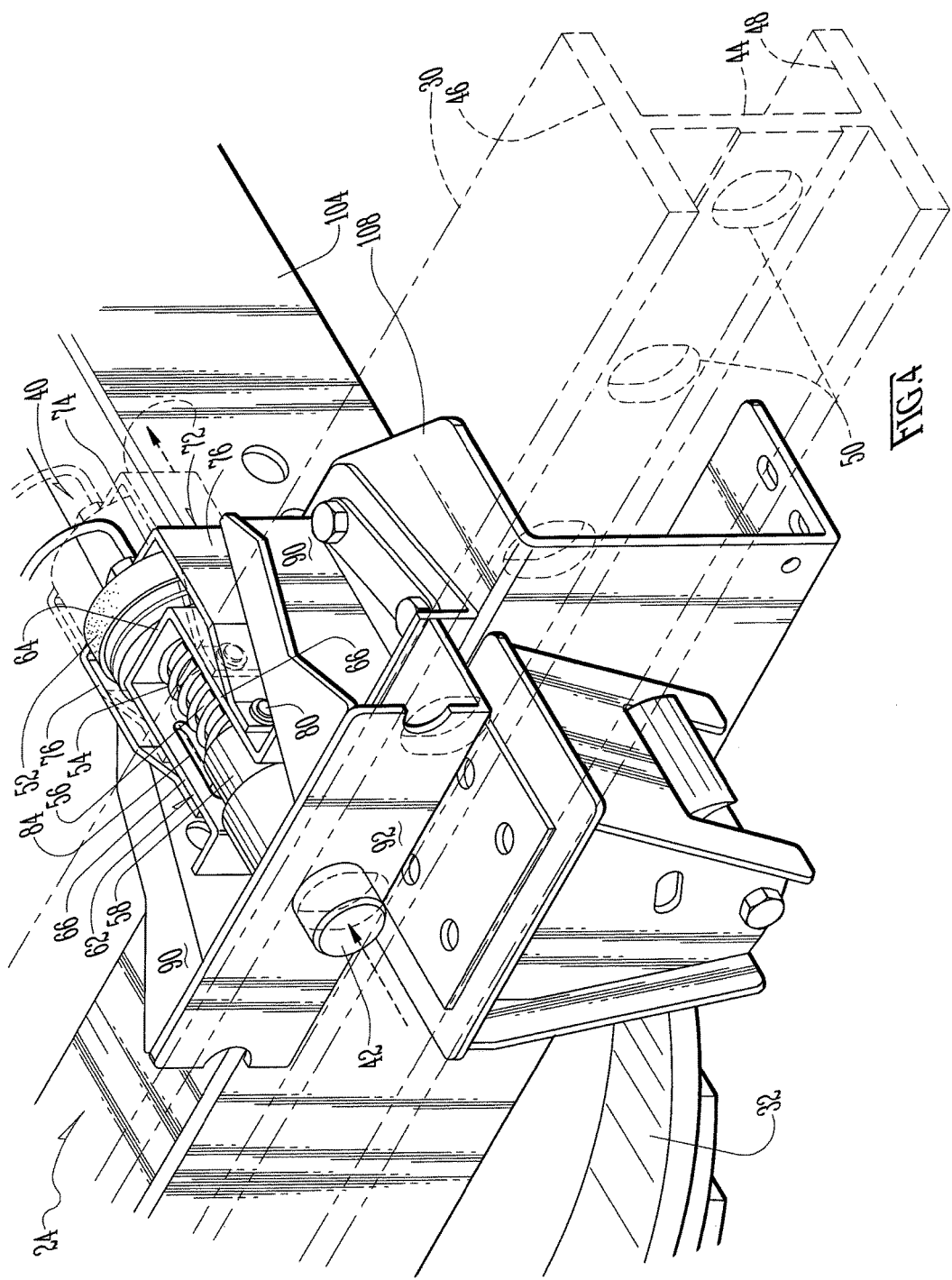
FIG. 4 is an enlarged-scale perspective view of detail IV-IV in FIG. 3.

FIG. 1 shows a non-exclusive example of a conventional heavy-duty vehicle 20 (eg., a semi-trailer 20 constructed for a heavy-duty load rating) that is mounted on a sliding sub-frame 24 in accordance with the invention (not in view, but see FIG. 2) for a heavy-duty vehicle suspension 32. FIG. 2 indeed shows the sliding sub-frame 24 in accordance with the invention, and FIG. 3 is an enlarged-scale view of the lower two-thirds of FIG. 2.

The vehicle 20 has at least a pair of under-hung tracks 30 in which the sliding sub-frame 24 in accordance can be slid between forward and rearward extremes. In FIG. 1, the exemplary heavy-duty vehicle 20 is a flatbed semi-trailer 20. The loads the trailer 20 can carry, while likely to be heavy, will be irregular in footprint on the deck 22 of the trailer 20. Some heavy loads will be concentrated on a small footprint while others may be distributed over a large footprint. Hence it is desirable to move the sliding sub-frame 24, the suspension 32 and the tandem axles 34 according to these differences.

The preferred suspension type for this heavy-duty suspension 32 is a mechanical spring suspension (eg., a leaf spring suspension, which is mechanical and in contrast to an air-spring suspension). Mechanical spring suspensions are advantageous in applications which require strength.

I. Air Sliding-Pin System 40

One aspect of the invention relates to improvements in the actuation of the sliding pins 42 which lock the sliding sub-frame 24 in a fixed position relative the vehicle 20.

FIGS. 4, 5, 7 and 8 show that the vehicle 20 has left and right underhung tracks 30. These underhung tracks 30 are formed by a pair of laterally-spaced longitudinally-extending I-beams, each which has a central vertical web 44 flanked between upper and lower horizontal flanges 46 and 48. The central web 44 is apertured with a series of location holes 50. The sliding sub-frame 24 in accordance with the invention has four (4) sliding pins 42 (at about the four corners thereof) for engaging the location holes 50 of the underhung tracks 30 of the vehicle 20.

Nowadays, it is common for sliding sub-frame suspensions to typically utilize a mechanical linkage system that actuates all pins in unison (not shown).

Such a mechanical linkage system certainly can be configured to be manually actuated. But it also possible to configure the mechanical linkage system to have an air-actuated assist cylinder or brake chamber that thus powers the mechanical linkage system. In other words, the common air assist arrangement known nowadays to actuate the slider pins is indirect, and as the air assist is transmitted across the mechanical linkage system.

It is an aspect of the invention to provide a sliding sub-frame 24 that has a mechanical (eg., leaf) spring suspension 32 with air assist actuation 52 for each sliding pin 42 to individually retract the associated sliding pin 42 from locking engagement with any of the location holes 50 therefor in the underhung tracks 30 of the vehicle 20. It is an additional aspect of the invention to potentially eliminate a costly and complicated mechanical linkage system.

Each sliding pin 42 is pre-loaded for extension in the locking position as by a coil compression spring 54 or the like so that—in the event of loss of air pressure—the default mode of the air sliding-pin system 40 is for the sliding pin 42 to be spring energized and engaged with the location holes 50 in the underhung tracks 30 of the vehicle 20. That way, in the event of loss of air pressure, the sliding pins 42 fix and lock the sliding sub-frame 24 in a non-sliding position.

Each individual sliding pin 42 utilizes a small air assist bladder 52 to inflate itself, overcome the spring-energized pre-load, and retract the sliding pin 42 from the underhung tracks 30 of the vehicle 20. That way, this eliminates the need for any mechanical linkage system connecting between two or more slider pins 42 (or all four). These small air assist bladders 52 are designed with an pneumatically inflatable bladder for cycling between inflated extension strokes and deflated retraction strokes. This allows for actuation movement without the requirements of piston and rod seals found in air-assist cylinders (not shown). This furthermore allows the air assist bladder 52 to be a robust component that should be tough against wear in a vehicular environment.

Each individual air assist bladder 52 has a hollow core such that when the air assist bladder 52 is deflated, it has a donut shape, and when inflated a tubular shape. The air sliding-pin system 40 further comprises an inboard-extending shaft 56 affixed to each sliding pin 42 and extended through the hollow core of the associated air assist bladder 52. The sliding pin 42 and shaft 56 can be machined out of the same piece of metal. The shaft 56 has a smaller diameter than the sliding pin 42, and thus the transition represents one or more inboard-facing transition(s) 58. The sliding pin 42 reciprocates along an axis flanked by an inner yoke 62 fixed to the sliding sub-frame 24. The inner yoke 62 has a web 64 flanked between spaced arms 66. The web 64 has an outboard surface that serves as the fixed and inboard seat for the coil-compression spring 54. One or another of the inboard-facing shoulders 58 of the transition 58 between the sliding pin 42 and shaft 56 therefor serves as the outboard and reciprocating seat for the coil-compression spring 54. The coil-compression spring 54 is disposed extended around the shaft 56 between these inboard and outboard seats 64 and 58 therefor.

Figure 5:
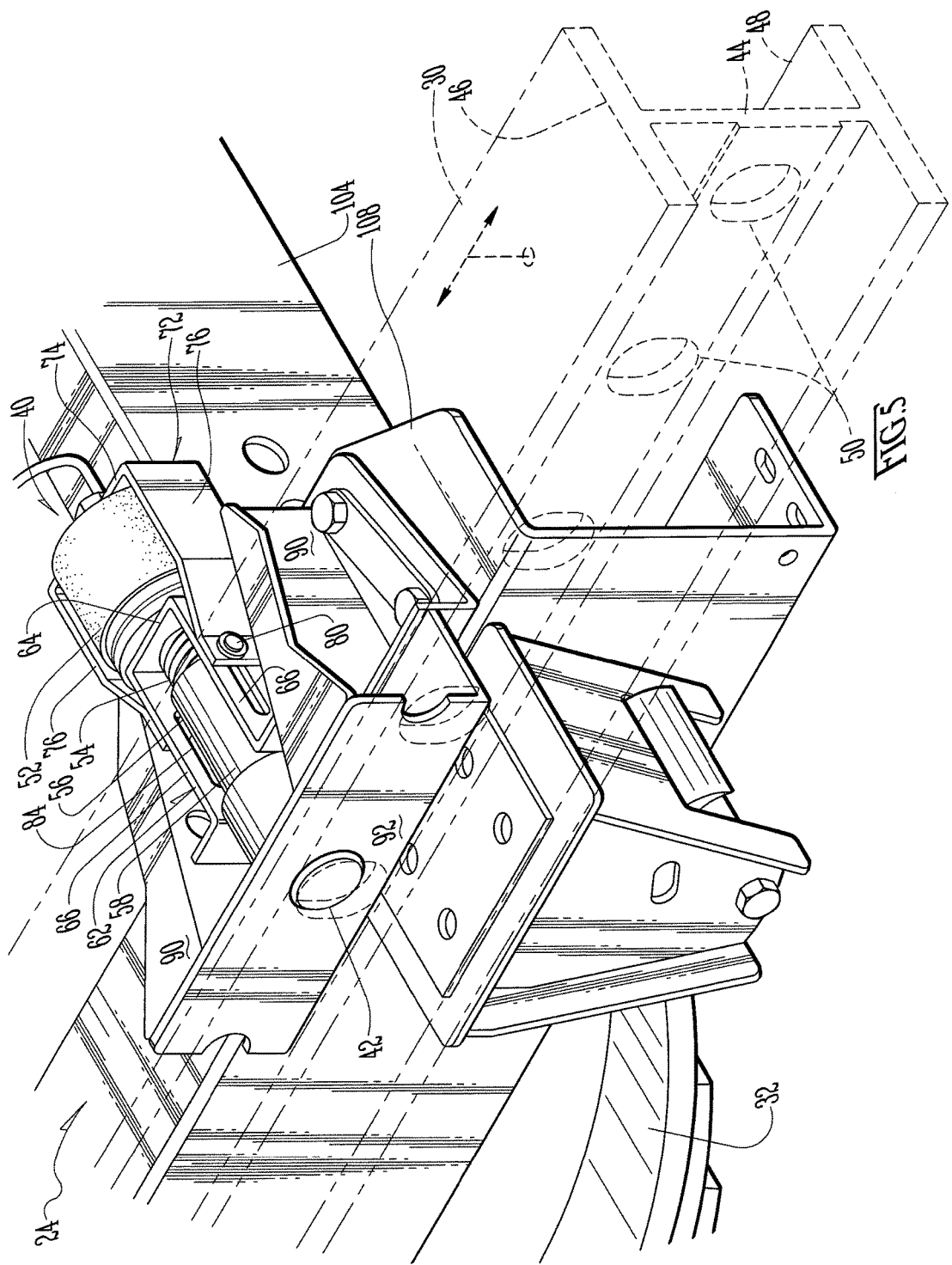
FIG. 5 is a perspective view comparable to FIG. 4 except showing the sliding pin retracted.
Figure 6:
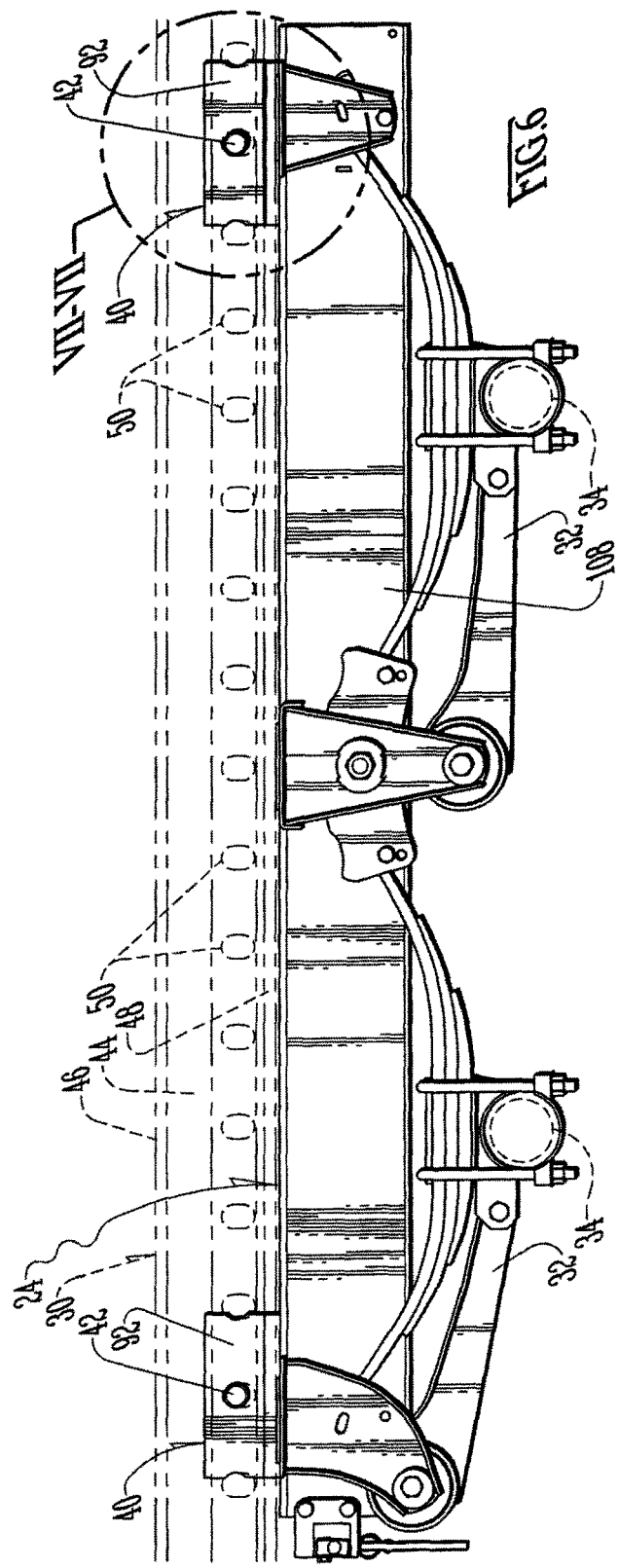
FIG. 6 is a side elevational view of FIG. 2.
Figure 7:
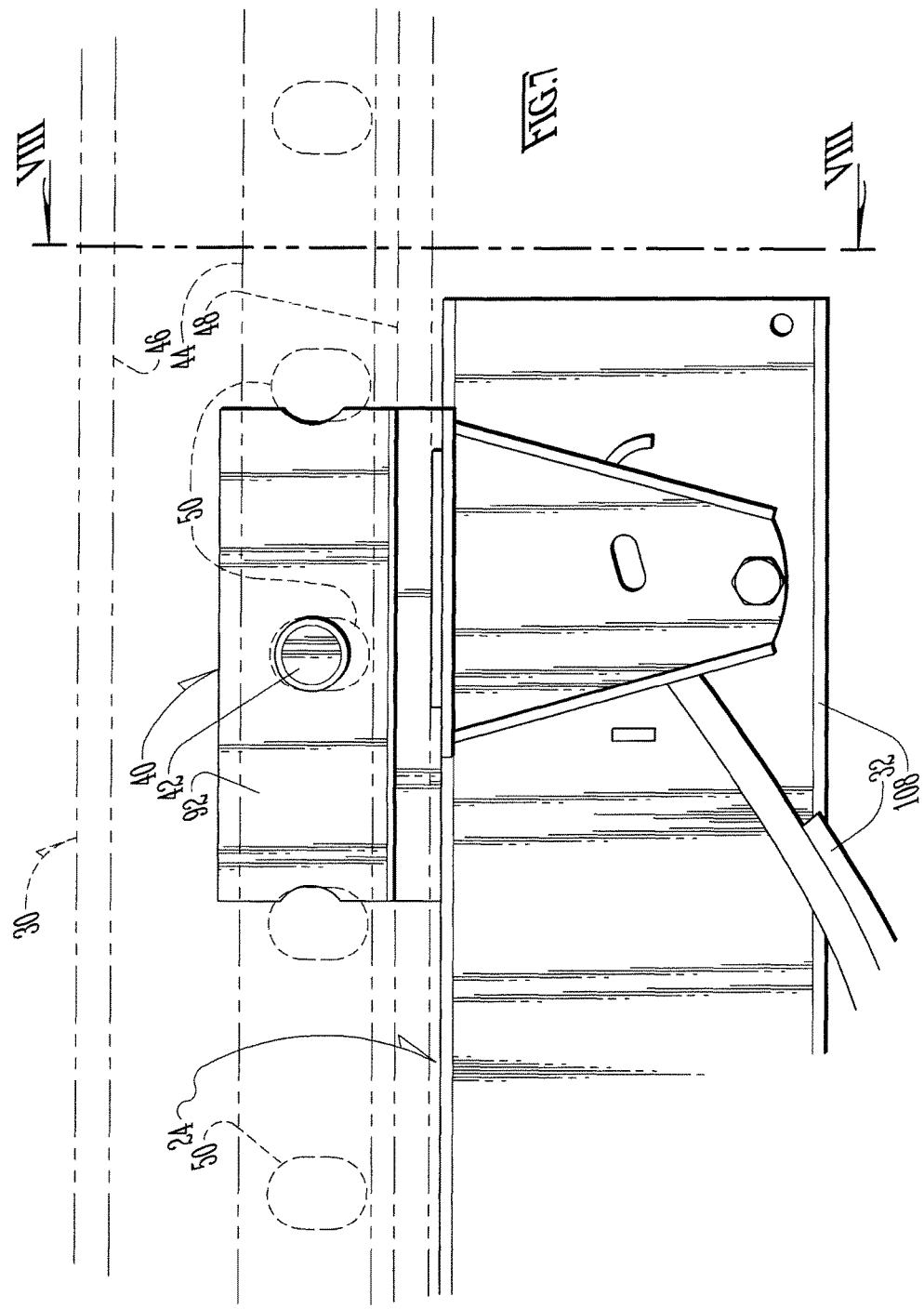
FIG. 7 is an enlarged-scale side elevational view of detail VII-VII indicated in FIG. 6.
Figure 8:
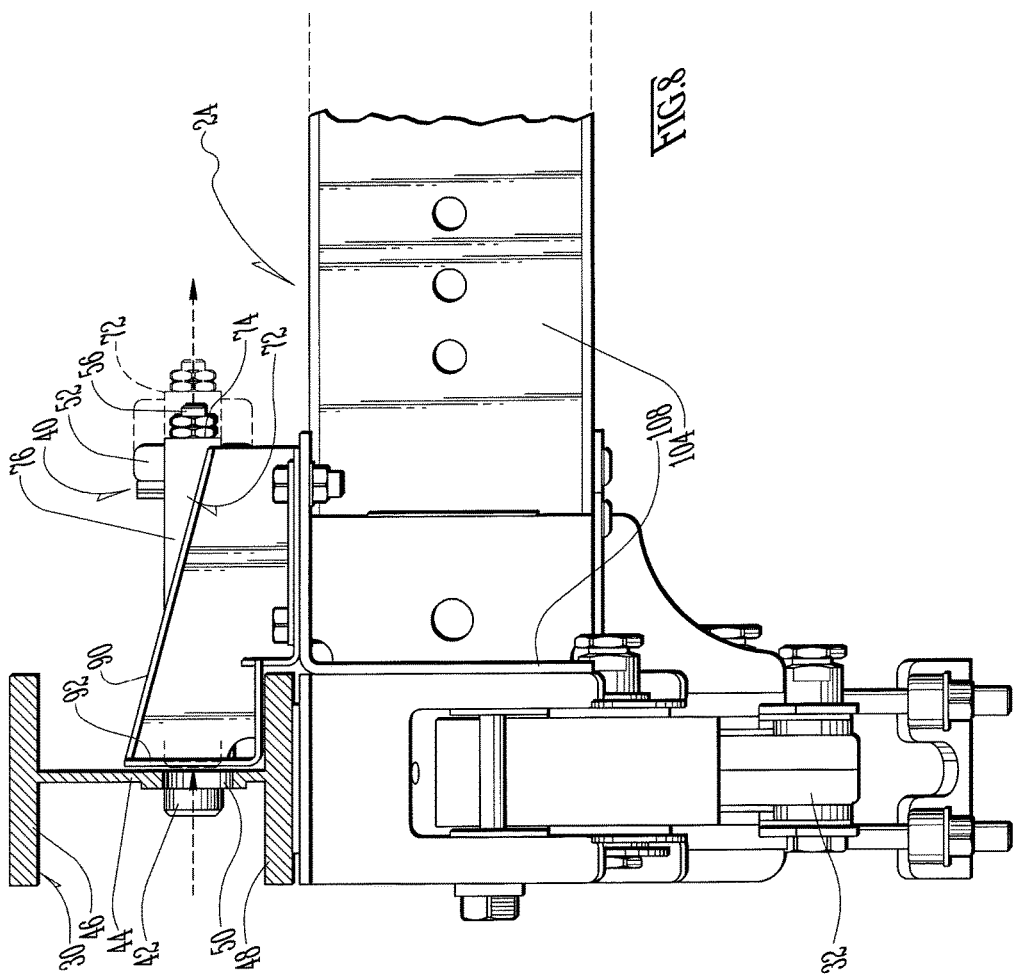
FIG. 8 is a rear elevational view, partly in section, taken in the direction of arrows VIII-VIII in FIG. 7.
Figure 9:
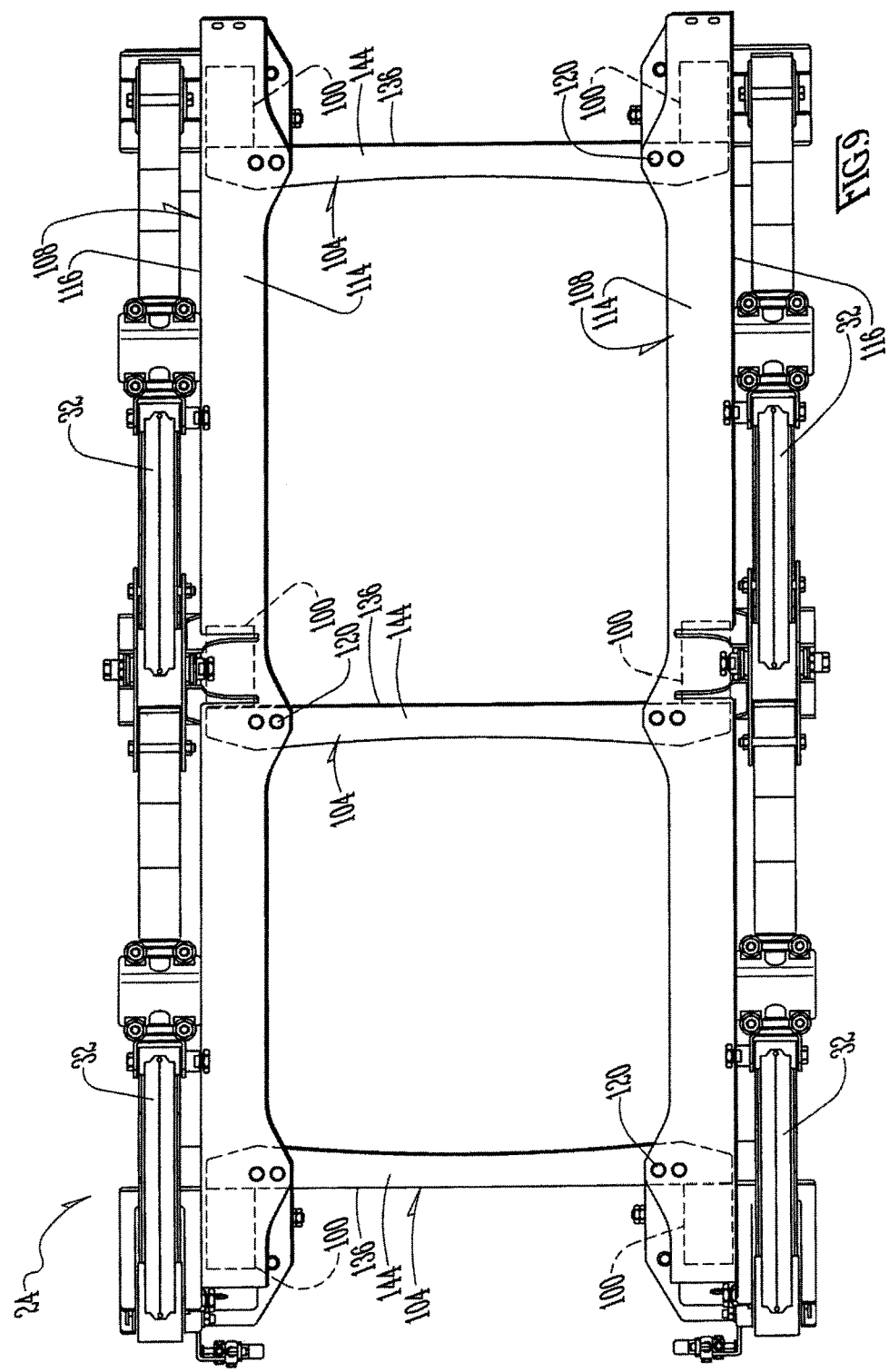
FIG. 9 is a top plan view of FIG. 6.

The air sliding-pin system 40 moreover comprises an outer and reciprocating yoke 72. The outer yoke 72 has a web 74 flanked between spaced arms 76. The web 74 presents an outboard surface that serves as the inboard seat for the air assist bladder 52. The web 64 of the inner (and fixed) yoke 62 presents an inboard surface that serves as the outboard seat for the air assist bladder 52. The fixed inner yoke 62 and reciprocating outer yoke 72 are connected by T-headed pins 80 affixed to the arms 66 or 76 of one of the yokes 62 or 72 (eg., as shown in FIG. 5, the T-headed pins 80 are affixed to the arms 76 of the outer reciprocating yoke 72) and a slot 84 in the arms 76 or 66 for the other yoke 72 or 62 (eg., as shown in FIG. 5, the slots 84 are in the arms 66 of the inner fixed yoke 62), and it is the slots 84 in which the T-headed pins reciprocate.

The air sliding-pin system 40 can be connected to a valve 86 to pressurize the air assist bladder 52 and retract each sliding pin 42 individually. This valve 86 can be connected to the emergency brakes 88 so that if the emergency brakes 88 are released the valve 86 will automatically reset to dump the air assist bladders 52 for the sliding pins 42, which as mentioned are pre-loaded by a coil-compression spring 54 to engage with the location holes 50 in the underhung tracks 30 of the vehicle 20. The air sliding-pin system 40 in accordance with the invention also allows for each sliding pin 42 to retract at its own rate, lessening the chance for a bound up sliding pin 42 and sliding sub-frame 24.

In use, a user pressurizes the air assist bladders 52 to pull the sliding pins 42 inboard and out of the location holes 50 in the underhung tracks 30 of the trailer 20. The sliding sub-frame 24 is thus free to move by setting the trailer brakes 88 and moving the trailer deck 22 forward or backward. When the trailer brakes 88 are released, the sliding pins 42 engage in the location holes 50 in the underhung tracks 30 of the trailer 20 as the coil-compression springs 54 independently push each one's associated sliding pin 42 into the target location hole 50 as the air is released.

Standard mechanical linkage systems (not shown) have all four sliding pins linked together with bars so if one sliding pin is stuck they are all stuck. It is an aspect of the invention that each of these sliding pins 42 and dedicated air assist bladder 52 are independent and can release on their own. That way, if one sliding pin 42 is stuck, it is a much easier job to get it unstuck by moving the trailer deck 22.

An air sliding-pin system 40 in accordance with the invention for a sliding sub-frame 24 of a heavy-duty vehicle suspension 32 preferably comprises the following aspects.

There is a mounting bracket 90 adapted to be affixed to a sliding sub-frame 24 and having an outer sidewall 92 adapted to slide by an underhung track 30 of a vehicle frame 22.

There is also a sliding pin 42 extending from a shaft 56 at a transition 58, the sliding pin 42 and shaft 56 reciprocating between an engaged (outer) extreme and retracted (inner) extreme, wherein the shaft 56 has a smaller diameter than the sliding pin 42, and the transition 58 represents an inner-facing shoulder 58.

The sidewall 92 of the mounting bracket 90 has an aperture for the sliding pin 42 to extend out of retract inside of as well as being adapted to register with location holes 50 in the underhung track 30 of the vehicle frame 22.

The mounting bracket 90 presents an inner sidewall 64 with an aperture sized for the shaft 56 to reciprocate therein.

There is moreover a coil-compression spring 54 inserted over the shaft 56 and confined between (1) the inner-facing shoulder 58 of the sliding-pin 42 to shaft 56 transition and (2) an outer surface of the inside sidewall 64 of the mounting bracket 90.

There is furthermore a reciprocating yoke 72 having spaced arms 76 reaching around the inner sidewall 64 from inboard of the inner sidewall 64 and coupled to either or both of the shaft 56 or the sliding pin 42, said spaced arms 76 flanking and joined together by a web 74.

A gas assist bladder 52 is provided and disposed between (1) the inner surface of the inside sidewall 64 of the mounting bracket 90 and (2) the web 74 of the reciprocating yoke 72.

Correspondingly, a source of pressurized gas 88 is provided for the gas assist bladder 52 whereby inflation of the gas assist bladder 52 pushes the reciprocating yoke 72 inboard and pulls the sliding pin 42 inboard as well, and, deflation of the gas assist bladder 52 allows the coil-compression spring 54 to push on the inner-facing shoulder 58 and push the sliding pin 42 outboard.

The gas assist bladder 52 deflated generally has a donut shape and inflated generally has a tubular shape.

The inner sidewall 64 of the mounting bracket 90 preferably comprises a web 64 of a fixed yoke 62 which has spaced arms 66 projecting from the web 64 of said fixed yoke 62 to fixed ends outward therefrom, and which fixed yoke 62 is nested inside of said reciprocating yoke 72.

Moreover, the arms 66 of the fixed yoke 62 are formed with elongated slots 84. Additionally, there are pin fasteners 80 reciprocating in the slots 84 of the arms 66 of the fixed yoke 62 and fastening, thereby linking in unison, (1) the arms 76 of the reciprocating yoke 72 laterally exterior of the arms 66 of the fixed yoke 62 with (2) either the sliding pin 42 or the shaft 56.

More preferably still, the pin fasteners 80 fasten and thereby link in unison (1) the arms 76 of the reciprocating yoke 72 laterally exterior of the arms 66 of the fixed yoke 62 with (2) just the sliding pin 42 only.

II. Torque Box 100

Another aspect the invention relates to stress-relief measures of shear strains at critical fastened (eg., bolted) connections.

In the past, attempts have been made to construct a sliding sub-frame 24 by bolting the lateral cross-members 108 either directly to the longitudinal side rails 108, or else, to a mating flange plate (not shown) that is welded to the longitudinal side rails.

Sliding sub-frames 24 are conventionally constructed with longitudinal main side rails 108 which can have any of a C-shape, Z-shape, or a G-shape and so on (C-shape shown in the drawings as a non-limiting example). C-shaped and G-shaped frame members are characterized by an upper and lower horizontal flange 112 and 114 flanking a vertical web 116. Z-shaped frame members (not shown) are characterized by an upper and lower horizontal flange 112 and 114 flanking a web (eg., 116) inclined at an oblique angle. When a cross member 104 is bolted to any of these shapes, the problem bolting areas are, surprisingly not the upper and lower flanges 112 and 114 but, the webs 116 of the side rails 108.

The flexing of the sliding sub-frame 24—under load—causes joint failure by means of shear-damaged or sheared-off bolts 120 (none are shown sheared off) at the bolt connections between the cross members 104 and the webs 116 of the side rails 108 (none of the bolts 120 are shown making such connections to webs 116).

Such damage or sheared-off bolts 120 leads to unit failure. It is an aspect of the invention to provide a means to control this flexing at the bolting areas in order to protect the integrity of the bolted joints. The longitudinal side rails 108 of the sliding sub-frame 28 still need to be flexible 'on the whole' to twist and contort with the vehicle frame 22 and/or 30, but just not at the bolted (or fastened) connections.

In other words, it is an aspect of the invention to stiffen the side rails 108 in the immediate areas of the connections between the side rails 108 and cross members 104.

The sliding sub-frame 24 in accordance with the invention is constructed with longitudinal main side rails 108 which may have any of a C-shape, a Z-shape, or a G-shape (C-shape is shown). The side rails 108 are preferably fastened to the lateral cross-members 104 and thereby form the box-frame construction of the sliding sub-frame 24 without welding of the side rails 108 to the cross-members 104.

The means of fastening the longitudinal side rails 108 to the lateral cross-members 104 is accomplished with the use of a transitional structure 100:—eg., the torque box 100 in accordance with the invention.

Again, the means of fastening the longitudinal side rails 108 to the lateral cross-members 10 is accomplished with the use of a transitional structure 100:—namely, a torque box 100 which has a construction that is welded to the longitudinal side rails 108 but is minimal in size to still allow adequate flexure of the side rails 108 and twist to move with the vehicle frame 22 and/or 30.

The torque box 100 is of such construction to be a strong joint between the side rails 108 and the cross-members 104 to reduce the twist loading between the mating parts that are fastened together. Suitable fasteners 120 for this application can be bolts and nuts, or rivets, or else otherwise Huck style fasteners and so on. The torque box 100 is constructed to fasten to the cross-member 104 with enough fasteners 120 to carry the vertical loading. The torque box 100 can be fully enclosed with a six sided construction, or it can have a five sided construction with the open wall 124 facing the web 116 of the side rail 108.

Figure 10:
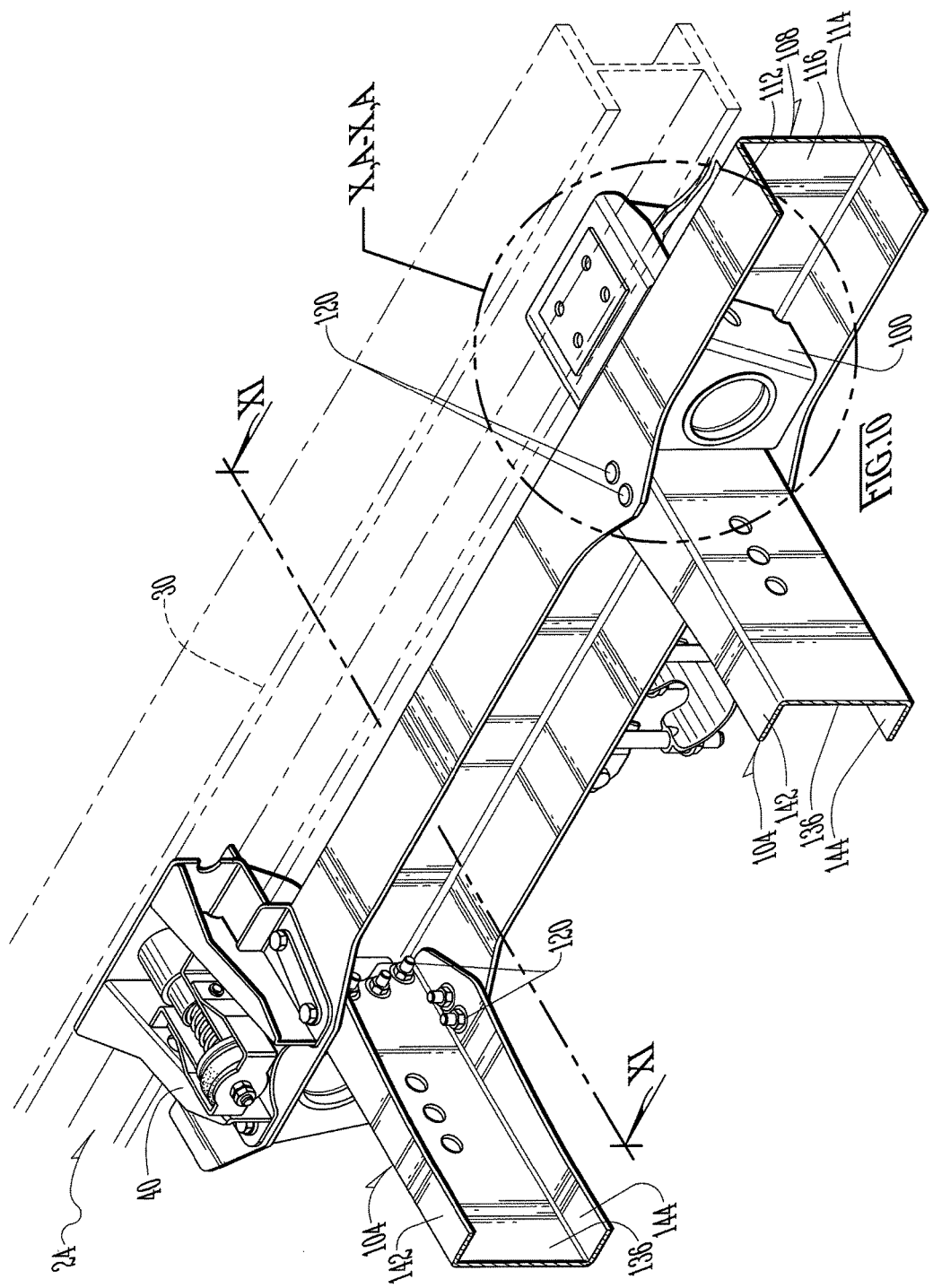
FIG. 10 is an enlarged-scale perspective view of the upper one-sixth of FIG. 2.
Figure 11:
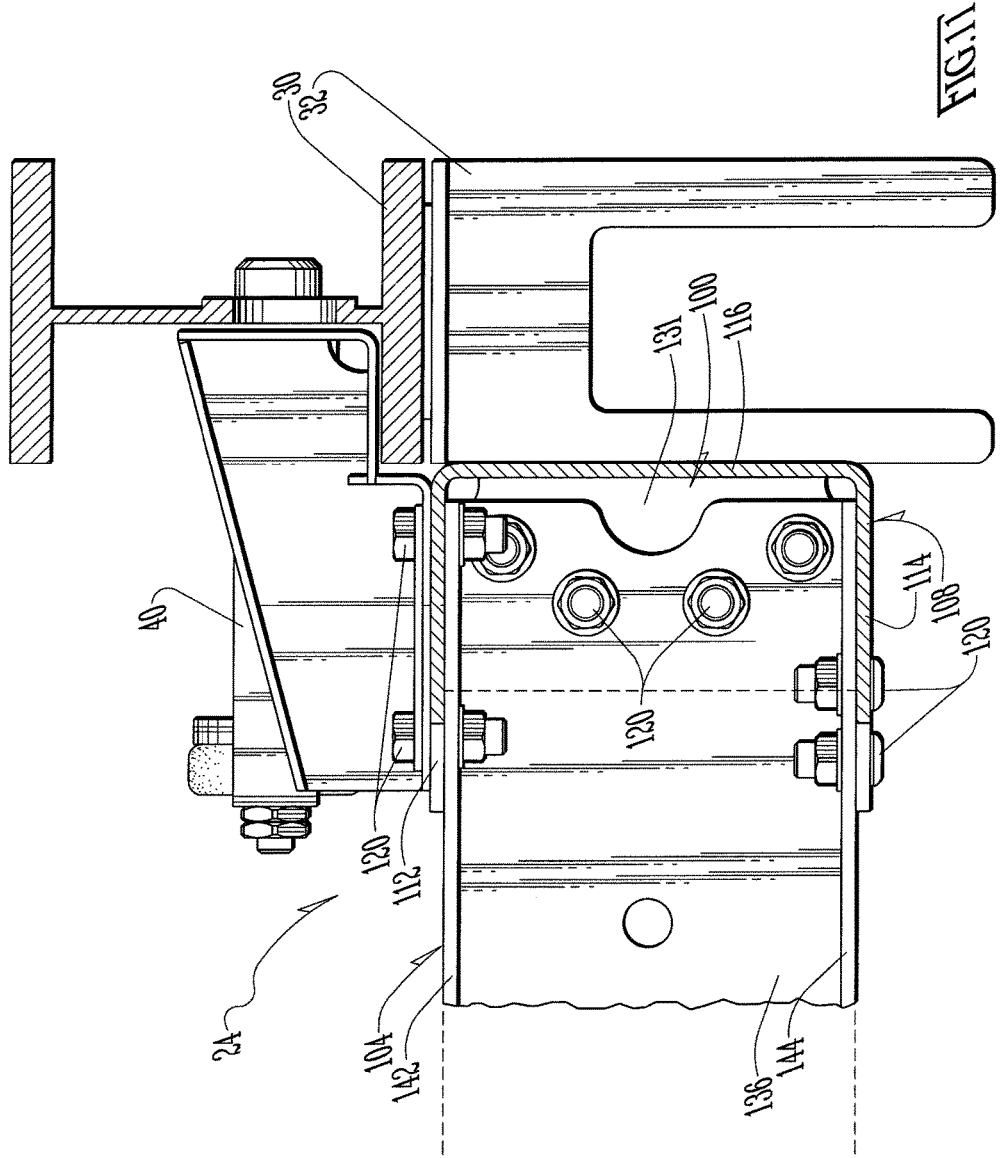
FIG. 11 is a rear elevational view, partly in section, taken in the direction of arrows XI-XI in FIG. 10.
Figure 12:
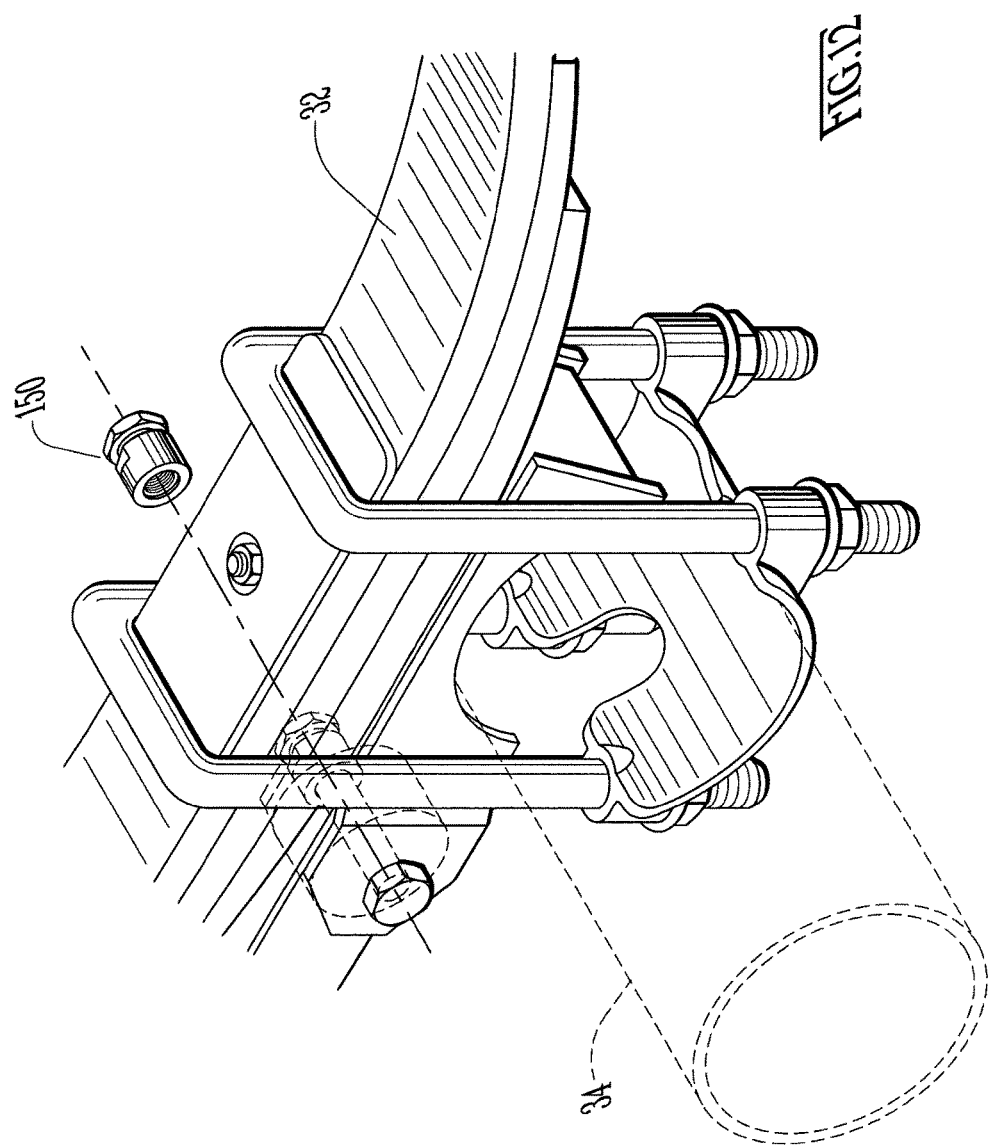
FIG. 12 is an enlarged-scale perspective view of detail XII-XII in FIG. 3.

FIGS. 10 and 10A show that the torque box 100 has a three-sided construction (eg., also like a channel). The torque box 100 is disposed within the channel defined among the upper and lower flanges 112 and 114 of the side rail 108 as well as web 116 of the side rail 108 on the inboard side thereof. The torque box 100 is affixed inside the channel of the respective side rail by eight weld seams 128:— three weld seams 128 along the front, inboard and rear BOTTOM edges to the lower flange 114 of the side rail 108;

three weld seams 128 along the front, inboard and rear TOP edges to the upper flange 112 of the side rail 108; and one weld seam 128 each along the front and rear outboard SIDE edges respectively to the inboard surface of the web 116 of the side rail 108.

The inboard panel 130 of the torque box is opened with an opening 134 to allow workers to manually insert the fasteners 120 between either the front or rear panel 131 or 132 of the torque 100 box and the web 136 of the cross member 104. The lateral cross-members 104 may be fastened to the upper and lower flanges 112 and 114 of the side rail 108.

Given the foregoing, the fastener connections are less at risk to shear damage. The flanges 112 and 114 of the side rail 108 as affixed by the torque box 100 to help control "racking" loads. The term "rack" here refers to either (1) being stretched and/or (2) being contorted out of a rectangular frame shape (ie., 90° or right angle corners) to some other parallelogram (ie., other than 900 or oblique corners). Because of the strength of the torque box 100 that is fully welded inside the channel 112, 114, 116 of side rails 108, its strength controls the forces created when the sliding sub-frame 24 is loaded, twisted, and/or racked. Moreover, the strength of torque box 100 reduces the shear movement and/or flexing between mating faces of (1) the flanges 112, 114 of the side rail 108 and the flanges 142 and 144 of the cross member 104, as well as (2) the web 136 of the cross rail 104 and either the front or rear panel 131 or 132 of the torque box 100. This thus reduces shear loading into the fasteners 120. Because of this, the life of the fasteners 120 and the joint is increased in the connections.

Other benefits include without limitation that the sliding sub-frame 24 can be assembled without relying on welds at the connections between the longitudinal side rails 108 and the lateral cross-members 104, which are areas that see high stress concentrations under loading and would cause welds therebetween (but there are no direct welds between the side rails 108 and cross members 104) to break and again obviously cause unit failure. Thus the design of the fastened-together slider sub-frame 24 is an improvement over purely welded type designs and, with the addition of the torque box 100 to the design, the fastened joints are protected from overloading.

I. Shear-Off Nut 150

A further aspect of the invention relates to a heavy-duty shear-off nut 150 for heavy-duty vehicle suspensions 32 which can be tightened by standard sockets 152, and not special sockets.

FIGS. 12 through 16 show a shear-off nut 150 in accordance with the invention adaptable, for heavy-duty vehicle suspensions 32, and which can be tightened by standard sockets 152.

Torque control break away nuts have been in service since the late 1960's but their design has been such that their installation required special tools or adaption guards to the fastener, so that they could not be installed with standard tools, and they could also not be serviced with standard tools.

It is an aspect of the invention to provide threaded nut fastener 150 for a truck or trailer heavy-duty suspension pivot joint. The shear-off nut 150 that has a tubular body that has three general sections:—

(1) a break-neck groove 154,
flanked between,
(2) an internally-threaded collet nut 158, and
(3) a break-away hex head 162.

The break-neck groove 154 serves as a breakaway shear feature that twists off at a design torque. The internally-threaded cylindrical collet nut 158 has an outside diameter that is just slightly less than the diameter across the flats 182 on the hex head 162. That way, as shown in FIGS. 15 and/or 15A, a standard size socket 152 can be used to torque the hex head 162 and be lightly supported by the cylindrical sidewall of the collet section 158.

The internally-threaded cylindrical collet nut 158 can have diametrically-opposed flats 174 (eg., wrench slots, as shown) or hex flats (not shown) along its top so that, after the hex head 162 has been twisted off, the internally-threaded cylindrical collet nut 158 can nevertheless be serviced with standard tools.

A preferred specifications of the shear-off nut 150 in accordance with the invention includes without limitation the following.

The shear-off nut 158 is designed to thread onto a grade 8 Hex Head Cap Screw, in a ⅞ inch diameter—9 threads per inch (UNC) size, with length being variable.

The preferred hex head 162 of the shear-off nut 150 would be in a 1⅝ inch (~41 mm) size. The preferred major diameter of the collet nut is 1 9/16 inches outside diameter (~40 mm). The clearance between the outside sidewall of the collet nut 158 very nearly fully spans the space between the flats of a 1⅝ inch (~41 mm) socket 152, as best shown in FIG. 15A.

The preferred span between the diametrically-opposed flats 174 at the top of the collet nut 158 is 1¼ inches apart (~32 mm). The preferred torque at which the break-neck 154 is designed to fail would be 550 foot-pounds (~750 Newton-meters)±50 foot-pounds (~±70 Newton-meters).

The large 1⅝ inch (~41 mm) hex nut 162 size makes it easier for Quality Control to visually inspect that it has been sheared off. Moreover, the 1⅝ inch (~41 mm) hex nut 162 size and collet nut 158 diameter of 1 9/16 inches (~40 mm) allows for a standard socket 152 to be fully engaged on both when shearing off to get proper break-away torque. The collet nut 158 is further serviceable for future maintenance with the advantageous wrench slots 174. The shear-off nut 150 in accordance with the invention is a heavy duty nut with tight thread locking performance. The hex head 162 can be twisted off by any suitable tool 176 including without limitation a torque wrench, a torque multiplier, an electric impact driver, a pneumatic impact driver and so on.

IV

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

I claim:

1. An air sliding-pin system for a sliding sub-frame of a heavy-duty vehicle suspension, comprising:
   a mounting bracket adapted to be affixed to a sliding sub-frame and having an outer sidewall adapted to slide by an underhung track of a vehicle frame;
   a sliding pin extending from a shaft at a transition, the sliding pin and shaft reciprocating between an engaged (outer) extreme and retracted (inner) extreme, wherein the shaft has a smaller diameter than the sliding pin, and the transition represents an inner-facing shoulder;
   the sidewall having an aperture for the sliding pin to extend out of and retract inside of as well as being adapted to register with location holes in the underhung track of the vehicle frame;
   the mounting bracket presenting an inner sidewall with an aperture sized for the shaft to reciprocate therein;
   a coil-compression spring inserted over the shaft and confined between (1) an inner-facing shoulder of the sliding-pin to shaft transition and (2) an outer surface of the inner sidewall of the mounting bracket;
   a reciprocating yoke having spaced arms reaching around the inner sidewall from inboard of the inner sidewall and coupled to either or both of the shaft or the sliding pin, said spaced arms flanking and joined together by a web;
   a gas assist bladder disposed between (1) an inner surface of the inner sidewall of the mounting bracket and (2) the web of the reciprocating yoke; and
   a source of pressurized gas for the gas assist bladder whereby inflation of the gas assist bladder pushes the yoke inwards and pulls the sliding pin inside, and, deflation of the gas assist bladder allows the coil-compression spring to push on the inner-facing shoulder and push the sliding pin out.

2. The air sliding-pin system of claim 1, wherein:
   the gas assist bladder deflated has a donut shape and inflated has a tubular shape.

3. The air sliding-pin system of claim 1, wherein:
   the inner sidewall of the mounting bracket comprises a web of a fixed yoke which has spaced arms projecting from the web of said fixed yoke to fixed ends outward therefrom, and which the fixed yoke is nested inside of said reciprocating yoke.

4. The air sliding-pin system of claim 3, wherein:

the arms of the fixed yoke are formed with elongated slots; and further comprising pin fasteners reciprocating in the slots of the arms of the fixed yoke and fastening, thereby linking in unison, (1) the arms of the reciprocating yoke laterally exterior of the arms of the fixed yoke with (2) either the sliding pin or the shaft.

5. The air sliding-pin system of claim 4, wherein:

the pin fasteners fasten and thereby link in unison (1) the arms of the reciprocating yoke laterally exterior of the arms of the fixed yoke with (2) the sliding pin.

\* \* \* \* \*